(12) United States Patent
Yamaguchi (10) Patent No.: US 6,999,632 B2
(45) Date of Patent: Feb. 14, 2006

(54) IMAGE PROCESSING APPARATUS, IMAGE FORMING APPARATUS AND IMAGE PROCESSING METHOD

(75) Inventor: Tomohiro Yamaguchi, Shinshiro (JP)

(73) Assignee: Minolta Co., Ltd., Osaka (JP)

( * ) Notice: Subject to any disclaimer, the term of this patent is extended or adjusted under 35 U.S.C. 154(b) by 619 days.

(21) Appl. No.: 10/082,072

(22) Filed: Feb. 26, 2002

(65) Prior Publication Data

US 2002/0118888 A1    Aug. 29, 2002

(30) Foreign Application Priority Data

Feb. 28, 2001    (JP)    ............... 2001-055768

(51) Int. Cl.
 *G06K 9/40*    (2006.01)
(52) U.S. Cl. .................. 382/266; 382/274
(58) Field of Classification Search ............... 382/266, 382/275, 260, 274; 358/532, 3.27, 521, 531, 358/538
See application file for complete search history.

(56) References Cited

U.S. PATENT DOCUMENTS

| | | | |
|---|---|---|---|
| 4,074,231 A | * | 2/1978 | Yajima et al. ............... 382/266 |
| 5,115,475 A | * | 5/1992 | Lebeau ........................ 382/146 |
| 5,339,365 A | * | 8/1994 | Kawai et al. ................ 382/176 |
| 5,995,248 A | * | 11/1999 | Katori et al. ................. 358/2.1 |
| 6,301,395 B1 | | 10/2001 | Nishigaki et al. |

FOREIGN PATENT DOCUMENTS

| | | |
|---|---|---|
| JP | 11-017956 | 1/1999 |
| JP | 2000-194857 | 7/2000 |

OTHER PUBLICATIONS

Baxes, Gregory A., Digital Image Processiing, 1994, John Wiley & Sons, Inc., ISBN 0-471-00949-0.*

* cited by examiner

*Primary Examiner*—Bhavesh M. Mehta
*Assistant Examiner*—Sath V. Perungavoor
(74) *Attorney, Agent, or Firm*—Buchanan Ingersoll PC (57) ABSTRACT

Disclosed is an image processing apparatus including an enhancement amount calculation unit for calculating a density enhancement amount for each edge pixel, which is a pixel in an edge area of an image, an enhancement amount increasing unit for increasing the density enhancement amount for each edge pixel in a manner to reduce variations in the enhancement amounts in the overall edge area, a density increasing unit for increasing the density of each edge pixel in a manner to reduce variations in density in the overall edge area, and an adder for adding the increased density inputted from the density increasing unit and the increased density enhancement amount inputted from the enhancement amount increasing unit, and for outputting the addition result.

9 Claims, 9 Drawing Sheets

| | 3911 | | | 3912 | |
|---|---|---|---|---|---|
| −1 | 0 | 1 | −1 | −2 | −1 |
| −2 | 0 | 2 | 0 | 0 | 0 |
| −1 | 0 | 1 | 1 | 2 | 1 |

| ⚠0 | 0 | 0 | 0 | ⚠0 | 0 | 0 |
|---|---|---|---|---|---|---|
| 0 | 0 | 0 | 0 | 0 | 0 | 0 |
| 50 | 70 | ⓒ60 | 60 | 80 | 50 | 60 |
| 70 | 90 | 80 | 80 | 100 | 70 | 80 |
| ⚠100 | 100 | 100 | 100 | ⚠100 | 100 | 100 |
| 100 | 100 | 100 | 100 | 100 | 100 | 100 |

FIG.7

| 0 | 0 | 0 | 0 | 0 | 0 | 0 |
|---|---|---|---|---|---|---|
| 0 | 0 | 0 | 0 | 0 | 0 | 0 |
| 0 | 20 | ⓒ10 | 10 | 30 | 0 | 10 |
| 20 | 40 | 30 | 30 | 50 | 20 | 30 |
| 0 | 0 | 0 | 0 | 0 | 0 | 0 |
| 0 | 0 | 0 | 0 | 0 | 0 | 0 |

FIG.8

| 0  | 0  | 0  | 0  | 0  | 0  | 0  |
|----|----|----|----|----|----|----|
| 0  | 0  | 0  | 0  | 0  | 0  | 0  |
| 40 | 40 | (40) | 50 | 50 | 50 | 30 |
| 40 | 40 | 40 | 50 | 50 | 50 | 30 |
| 0  | 0  | 0  | 0  | 0  | 0  | 0  |
| 0  | 0  | 0  | 0  | 0  | 0  | 0  |

FIG.9

| 0  | 0  | 0  | 0  | 0  | 0  | 0  |
|----|----|----|----|----|----|----|
| 0  | 0  | 0  | 0  | 0  | 0  | 0  |
| 90 | 90 | (90) | 100 | 100 | 100 | 80 |
| 100| 100| 100| 100| 100| 100| 100|
| 100| 100| 100| 100| 100| 100| 100|
| 100| 100| 100| 100| 100| 100| 100|

FIG.10

| 0 | 0 | 0 | 0 | 0 | 0 | 0 |
|---|---|---|---|---|---|---|
| 0 | 0 | 0 | 0 | 0 | 0 | 0 |
| 130 | 130 | (130) | 150 | 150 | 150 | 110 |
| 140 | 140 | 140 | 150 | 150 | 150 | 130 |
| 100 | 100 | 100 | 100 | 100 | 100 | 100 |
| 100 | 100 | 100 | 100 | 100 | 100 | 100 |

FIG.11A

| 0 | 0 | 0 | 0 | 0 | 0 | 0 |
|---|---|---|---|---|---|---|
| 0 | 0 | 0 | 0 | 0 | 0 | 0 |
| 50 | 90 | (70) | 70 | 110 | 50 | 70 |
| 90 | 130 | 110 | 110 | 150 | 90 | 110 |
| 100 | 100 | 100 | 100 | 100 | 100 | 100 |
| 100 | 100 | 100 | 100 | 100 | 100 | 100 |

Comparative Example 1 (First Prior Art Technique)

FIG.11B

| 0 | 0 | 0 | 0 | 0 | 0 | 0 |
|---|---|---|---|---|---|---|
| 0 | 0 | 0 | 0 | 0 | 0 | 0 |
| 90 | 110 | (100) | 110 | 130 | 100 | 90 |
| 120 | 140 | 130 | 130 | 150 | 120 | 130 |
| 100 | 100 | 100 | 100 | 100 | 100 | 100 |
| 100 | 100 | 100 | 100 | 100 | 100 | 100 |

Comparative Example 2 (Second Prior Art Technique)

IMAGE PROCESSING APPARATUS, IMAGE FORMING APPARATUS AND IMAGE PROCESSING METHOD

This application is based on an application No. 2001-055768 filed in Japan, the contents of which are hereby incorporated by reference.

BACKGROUND OF THE INVENTION (1) Field of the Invention

The present invention relates to an image processing apparatus, an image forming apparatus, and an image processing method, and especially to an edge enhancement processing technique.

(2) Description of the Related Art

In practice employed in an image forming apparatus such as a digital color copier, an original image obtaining by reading a document is subjected to so-called edge enhancement processing in order to increase the density of edge areas (for example, boundaries between a character image and a background image) before such an image is formed on a recording sheet. Such edge enhancement processing is carried out by an image processing apparatus installed in an image forming apparatus in order to sharpen boundaries and thus to improve readability of, for example, characters by widening the difference in density between edge areas and background.

In a conventional image processing apparatus, when a target pixel, i.e. a pixel currently subjected to processing, is judged to be a pixel in an edge area, the target pixel is enhanced by an enhancement amount that is determined in relation to pixels surrounding the target pixel within a predetermined area (hereinafter, this technique is referred to as "a first prior art technique"). Although this technique successfully sharpens boundaries, there is a problem as follows. That is, since the edge enhancement processing is to simply add an enhancement amount to each pixel in edge areas in an original image, when density variations originally exist in the edge areas, not only that the density variations remain even after the processing, but also that the density variations become even more noticeable.

To address the above problem, there has been another technique in which each pixel in edge areas is increased its density in a manner to reduce the difference in density with the surrounding pixels, and then an enhance amount as above is applied to each pixel (hereinafter, this technique is referred to as "a second prior art technique").

Although better then the first prior art technique, according to the second prior art technique, density variations that exist in edge areas of an original image still remain noticeable to a considerable extent even after edge enhancement processing.

SUMMARY OF THE INVENTION

A first object of the present invention is to provide an image processing apparatus for performing edge enhancement processing in a manner to further reduce density variations.

A second object of the present invention is to provide an image forming apparatus that employs such an image processing apparatus.

A third object of the present invention is to provide an image processing method for performing edge enhancement processing in a manner to further reduce density variations.

(1) The first object of the present invention described above is achieved by an image processing apparatus for conducting edge enhancement processing on an original image, comprising: an enhancement amount calculation unit for calculating a density enhancement amount for each edge pixel of the original image, the edge pixel being a pixel in an edge area in the image; an enhancement amount processing unit for correcting the density enhancement amount for each edge pixel in a manner to reduce variations in the density enhancement amounts in the overall edge area; a density processing unit for correcting a density of each edge pixel of the original image in a manner to reduce variations in densities in the overall edge area; and a density calculation unit for calculating an enhanced density of each edge pixel from the corrected density and the corrected density enhancement amount.

(2) Alternatively, the first object of the present invention as described above is achieved by an image processing apparatus for conducting edge enhancement processing on image data, comprising: a judgment unit for judging whether a target pixel is an edge pixel which is in an edge area, based on the image data; an enhancement amount calculation unit for calculating first data expressing an edge enhancement amount for the target pixel based on the image data; a first processing unit for changing a value of the first data for the target pixel to a greatest value among first data of a) the target pixel and b) a plurality of pixels surrounding the target pixel; a second processing unit for changing a value of the image data of the (3) The second object of the present invention described above is achieved by an image forming apparatus for forming an image, comprising the image processing apparatus of (1), wherein the image is formed based on image data on which edge enhancement processing has been conducted by the image processing apparatus.

(4) Alternatively, the second object of the present invention is achieved by an image forming apparatus for forming an image, comprising the image processing apparatus of (2), wherein the image is formed based on the image data on which edge enhancement processing has been conducted by the image processing apparatus.

(5) The third object of the present invention described above is achieved by image processing method for conducting edge enhancement processing on an original image, the method comprising steps of: calculating a density enhancement amount for each edge pixel of the original image, the edge pixel being a pixel in an edge area in the image; increasing the density enhancement amount for each edge pixel in a manner to reduce variations in the density enhancement amounts in the overall edge area; increasing density of each edge pixel of the original image in a manner to reduce variations in densities in the overall edge area; and calculating enhanced density of each edge pixel by adding the increased density enhancement amount to the increased density.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Hereinafter, description is given to one preferred embodiment of the present invention with reference to the drawings.

Figure 1:
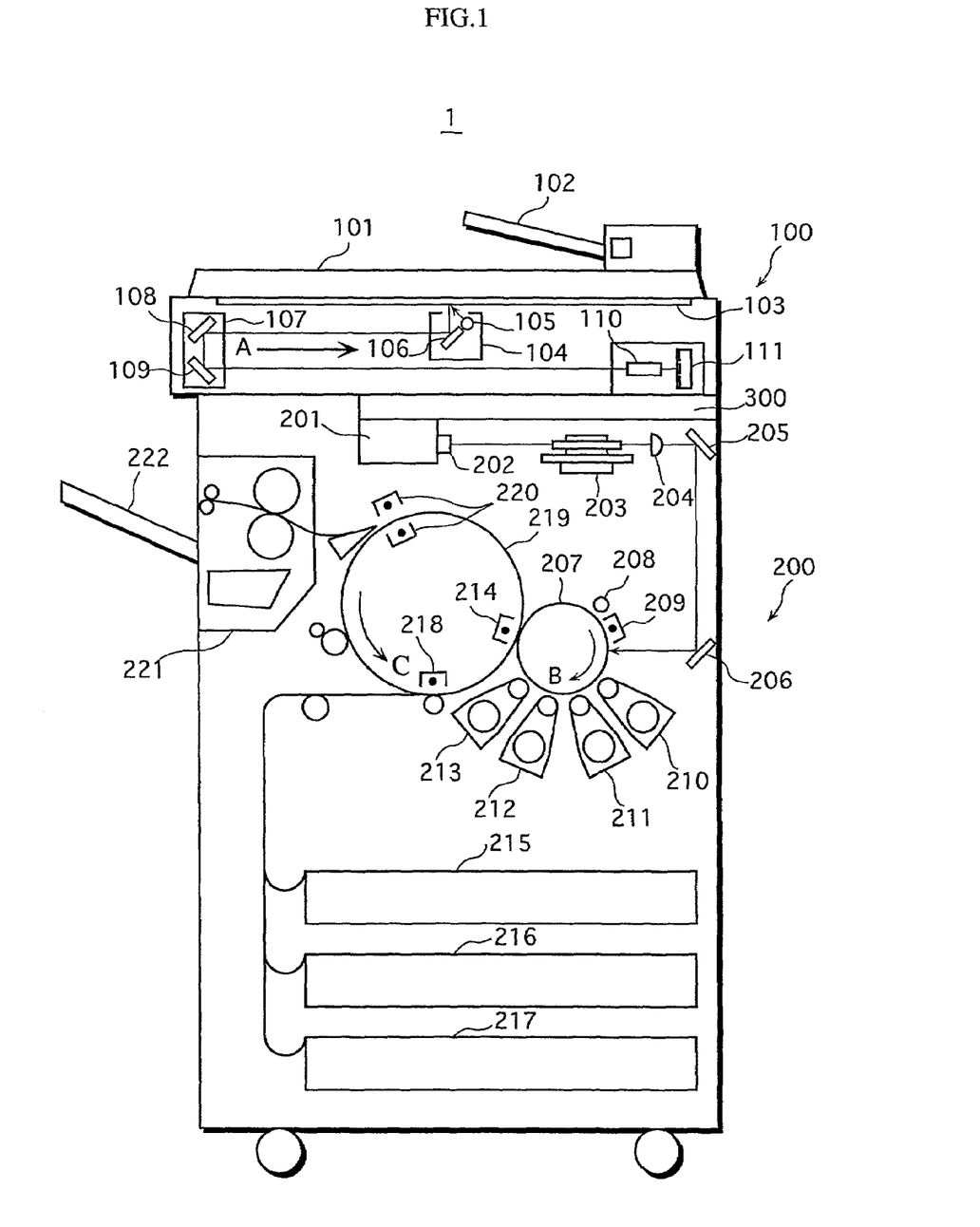
FIG. 1 is a view schematically showing the overall construction of a digital color copier.

FIG. 1 is a view schematically showing the construction of a digital color copier (hereinafter, referred to simply as "a copier") 1 according to the preferred embodiment of the present invention.

As shown in the figure, the copier 1 is broadly constructed of an image reader unit 100 for reading a document image, and a printer unit 200 for printing to reproduce the read image onto a recording sheet.

The image reader unit 100 includes an automatic document feeder (ADF) 101. Documents placed on a document tray 102 of the ADF 101 are fed one by one to a glass table 103. A document fed to the glass table 103 is exposed to light emitted from an exposure lamp 105 included in a scanner 104 that runs in a sub-scanning direction indicated in the figure by an arrow A. The light reflected off the document surface is changed its optical path as shown in the figure by a mirror 106 provided inside the scanner 104 as well as by mirrors 108 and 109 provided inside a mirror box 107 that travels in the same direction as, and at a half the speed of the scanner 104. The reflected light then forms an image on a three-line, reduction type full-color CCD sensor (hereinafter, referred to simply as "a CCD sensor") 111 by passing through a lens 110. The CCD sensor 111 converts the reflected light from the document surface into analog signals of each color component, namely R (red), G (green), and B (blue). The resulting analog signals are then converted into digital data of each color component, namely, cyan, magenta, yellow, and black through processing, which will be described later, conducted by an image signal processing unit 300. The resulting digital data (image data) is then stored in an image memory (not illustrated) provided within the printer unit 200.

The image data stored in the image memory is inputted to a laser control unit 201 that is also provided within the printer unit 200. The laser control unit 201 generates a laser diode drive signal that causes a laser diode 202 to illuminate. A laser beam emitted from the laser diode 202 is deflected by a polygon mirror 203 to pass through an fθ lens 204. The laser beam is then changed its optical path successively by mirrors 205 and 206 so as to exposure-scan the surface (photosensitive surface) of a photosensitive drum 207 that rotates in the direction indicated by an arrow B.

Disposed around the photosensitive drum 207 are an eraser lamp 208, an electrostatic charger 209, toner developer units 210–213 of cyan, magenta, yellow, and black, respectively, and a transfer charger 214. Prior to being exposure-scanned as above, the photosensitive drum 207 has been irradiated by the eraser lamp 208 for diselectrification, and then uniformly charged by the electrostatic charger 209. When the uniformly electrified photosensitive surface is exposed to light, an electrostatic latent image is formed thereon. The electrostatic latent image is then developed by one of the above toner developer units as a toner image.

On the other hand, a recording sheet of a desired size is fed from one of paper feeding cassettes 215–217. By the action of an electrostatic-attraction charger 218, the recording sheet is wound around (adheres to) a transfer drum 219 that rotates in the direction indicated by an arrow C. The recording sheet is then carried to a position facing the transfer charger 214 where the toner image formed on the photosensitive drum 207 is transferred onto the recording sheet by the action of the transfer charger 214.

The above process from exposure to transfer is repeated on a single recording sheet for each color of cyan, magenta, yellow, and black to form toner images of the colors being overlapped with each other, so that a color image is reproduced.

The recording sheet on which the toner image is transferred loses its adhesive action to the transfer drum 219 by a separation discharging charger 220. As a result, the recording sheet is separated from the transfer drum 219, the toner image is fixed by a fixer 221, and then the recording sheet is ejected onto a tray 222.

Note that in the case of reproducing a black-and-white image (monochrome copy), the above process from exposure to transfer is carried out only for a black toner image.

Figure 2:
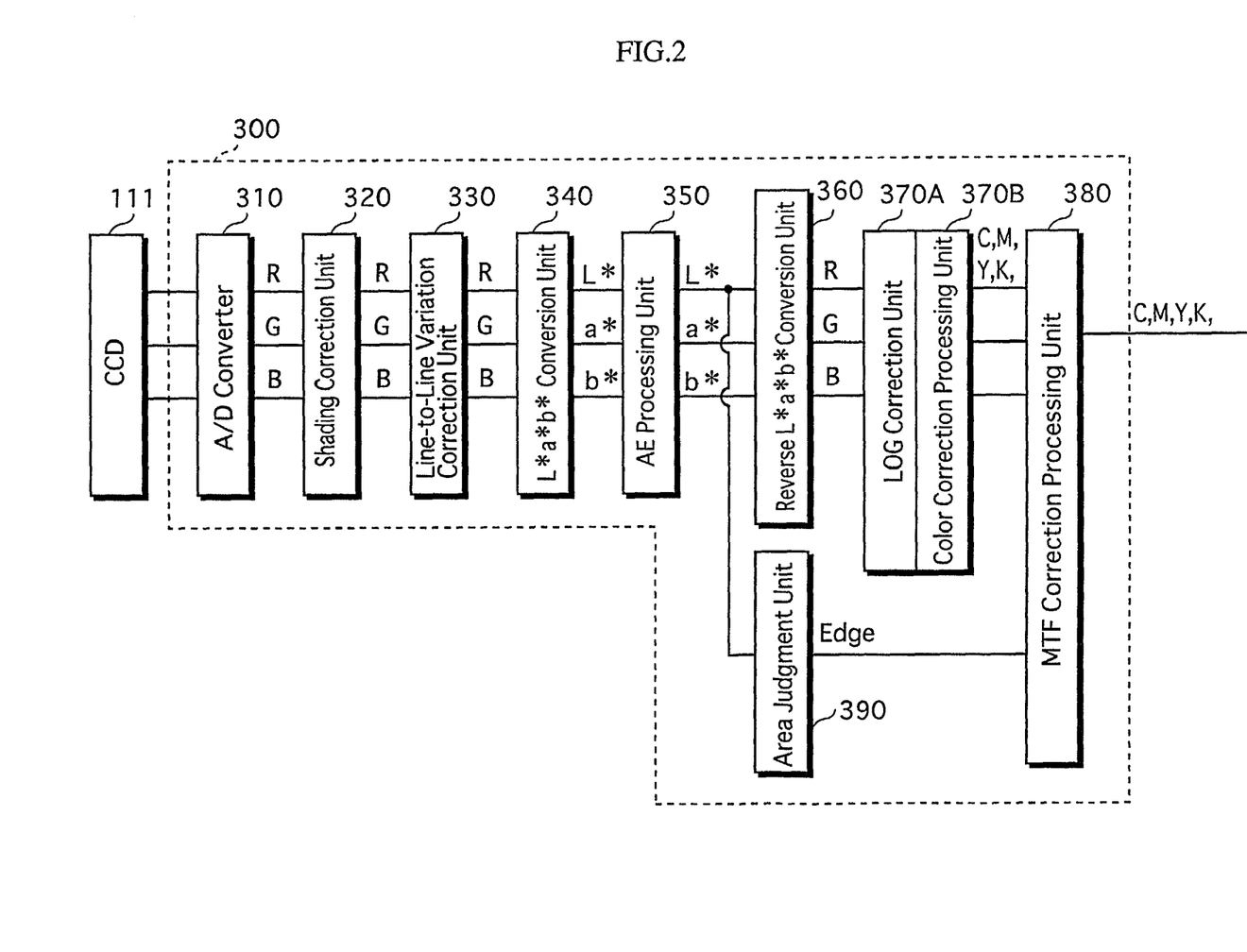
FIG. 2 is a block diagram showing an image signal processing unit.

FIG. 2 is a block diagram showing the image signal processing unit 300.

Analog signals obtained through photoelectric conversion performed by the CCD sensor 111 are converted by an A/D converter 310 to multivalued digital image data of R, G, and B. The image data is corrected by a shading correction unit 320 in a manner to eliminate density variations among pixels caused in the CCD sensor 111 as well as variations in reading caused by uneven exposure by the exposure lamp 105, and then inputted to a line-to-line variation correction unit 330.

R, G, B chips in the CCD sensor 111 have document reading positions that are shifted with each other in the sub-scanning direction at predetermined intervals with the R chip being the first. For this reason, the line-to-line variation correction unit 330 selectively stores data on R and G of the image data (hereinafter, the data on R, G, B images are referred to simply as "R data", "G data", and "B data", respectively) in a FIFO memory (not illustrated) and delays the R data and the G data for predetermined time periods, so that the output timing of R data and G data coincides with the output timing of B data.

The RGB data outputted from the line-to-line variation correction unit 330 is subjected to representative color system conversion by an L*a*b* conversion unit 340 to generate L* (lightness index) data and a* and b* (chromaticness indices) data. The converted L*a*b* image data is then inputted to an AE processing unit 350.

The AE processing unit 350 judges whether the document read is monochrome or color based on the inputted L*a*b* image data, and appropriately adjusts a under color to prevent a see-through image or fogging of background.

After the under color adjustment, the L*a*b* image data is converted back to RGB image data by a reverse L*a*b* conversion unit 360, and inputted to an LOG correction unit 370A and a color correction processing unit 370B.

The LOG correction unit 370A converts the inputted RGB image data serving as luminance data to density data on Y (yellow), M (magenta), and C (cyan), which are the colors of toners. On the other hand, the color correction processing unit 370B generates density data on K (black) by conducting under color removal processing or masking processing on the density data.

The CMYK image data serving as density data is subjected to edge enhancement processing, which will be described later, by an MTF (Modulation Transfer Function) correction processing unit 380, and then outputted to the printer unit 200.

On the other hand, among the L*a*b* image data outputted from the AE processing unit 350, L* (lightness index) data is also inputted to an area judgment unit 390. The area judgment unit 390 judges whether a pixel corresponding to the inputted data is a pixel in an edge area or a pixel in a density flat area.

Note that such a pixel in an edge area (a pixel included in image edges) is hereinafter referred to as an edge pixel.

Figure 3A:
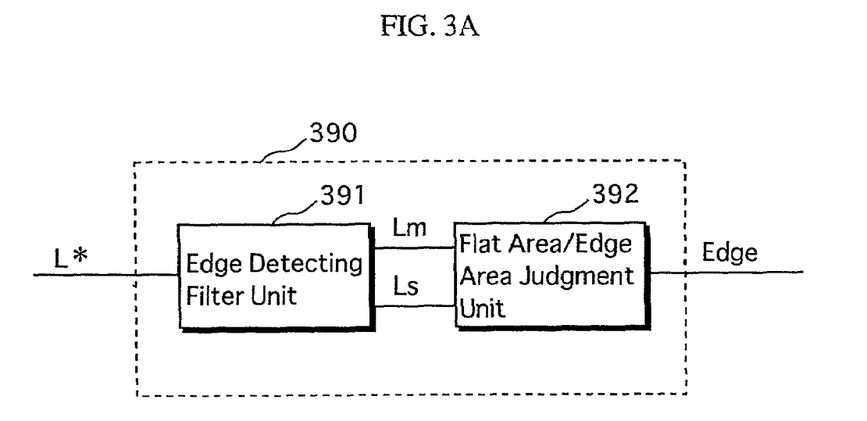
FIG. 3A is a block diagram showing an area judgment unit included in the above image signal processing unit.

FIG. 3A is a block diagram showing the area judgment unit 390.

Figure 3B:
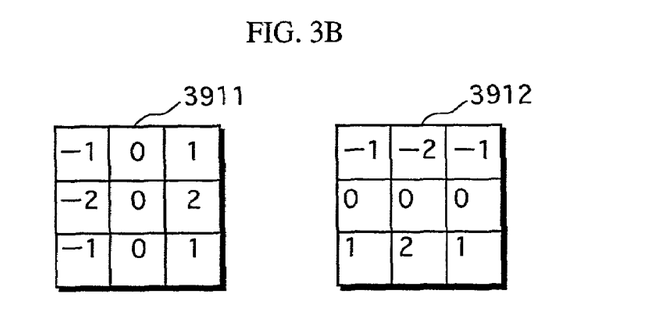
FIG. 3B is a view showing primary differential filters for detecting edges used by the above area judgment unit.

The L* data from the AE processing unit 350 is inputted to an edge detecting filter unit 391. As shown in FIG. 3B, the edge detecting filter unit 391 has primary differential filters 3911 and 3912 for detecting edges. Each of the primary differential filters 3911 and 3912 is formed of 3 by 3 pixels in the main scanning direction and the sub-scanning direction. The result Lm of primary differentiation of L* data in the main scanning direction and the result Ls of primary differentiation of L* data in the sub-scanning direction are outputted to a flat area/edge area judgment unit 392.

The flat area/edge area judgement unit 392 judges whether the pixel currently processed is a pixel in a density flat area or a pixel in an edge area. To be more specific, the average value La of each absolute value of Lm and Ls obtained by the primary differentiation [La=(|Lm|+|Ls|/2)], the thus obtained value La is compared with a predetermined threshold value Lth. When La<Lth, it is judged that the current pixel is a pixel in a density flat area, and when La≧Lth, it is judged that the current pixel is an edge pixel.

The reason for the above judgment is that generally, there is a large change in density at a boundary between a density flat area and an edge area. Accordingly, when the primary differential value of lightness (index) is equal to, or greater than a predetermined value, the current pixel is judged to be an edge pixel. The reason for obtaining the primary differential values in two directions, which are the main scanning direction and the sub-scanning direction, is to raise reliability of the edge judgment.

As described above, the flat area/edge area judgment unit 392 judges whether the inputted image data corresponds to a pixel in a density flat area or an edge area, and outputs the result as an edge signal (an off signal when the pixel is in a density flat area, and an on signal when it is an edge pixel) to the MTF correction processing unit 380 that follows.

Figure 4:
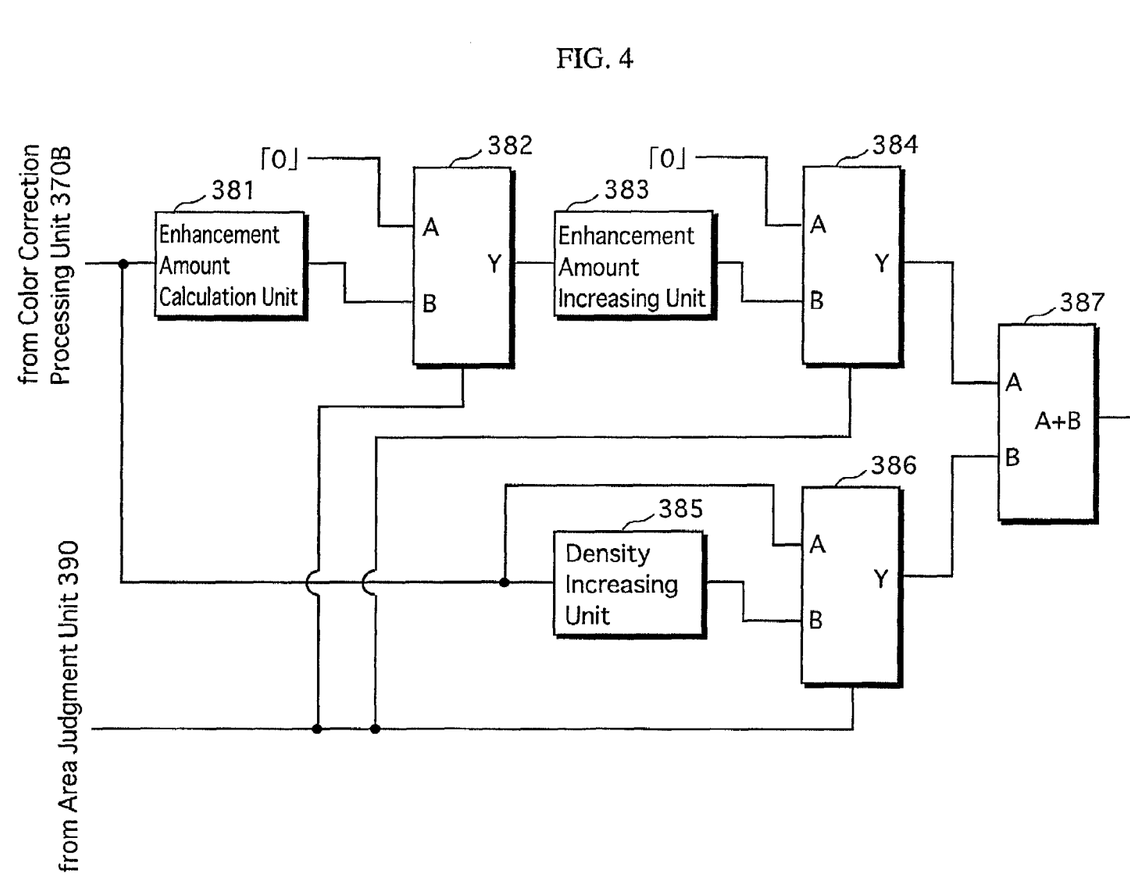
FIG. 4 is a block diagram showing an edge enhancement processing unit which is included in an MTF correction processing unit which in turn included in the above image signal processing unit.

FIG. 4 is a block diagram showing an edge enhancement processing unit included in the MTF correction processing unit 380.

As shown in the figure, the edge enhancement processing unit is constructed of an enhancement amount calculation unit 381, an enhancement amount increasing unit 383, and a density increasing unit 385 as well as their respective selectors 382, 384, and 386 positioned immediately downstream from each unit. The selector 384 and the selector 386 are connected to an adder 387 at their output ends.

Figure 5A:
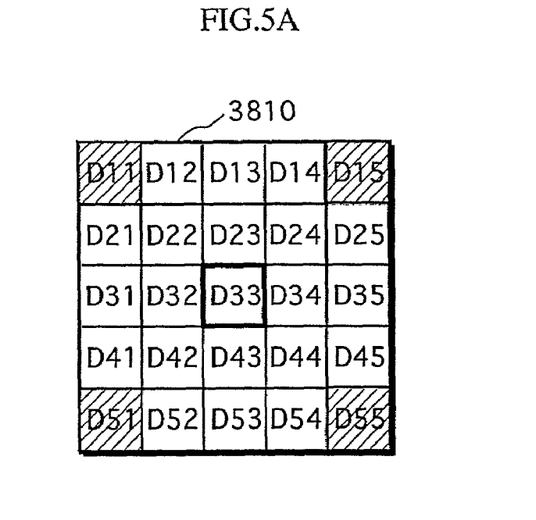
FIG. 5A is a view showing an enhancement amount extraction filter used by an enhancement amount calculation unit included in the above edge enhancement processing unit.

The enhancement amount calculation unit 381 extracts an enhancement amount to be applied to density data "D" of each pixel that is inputted from the color correction processing unit 370B using an enhancement amount extraction filter 3810 formed of 5 by 5 pixels, as shown in FIG. 5A. Note that hereinafter, the reference "D" is used to represent each pixel and its density. When a pixel $D_{33}$ located at the center of the above filter is set as a target pixel, the enhancement amount calculation unit 381 calculates an enhancement amount $\Box D_{33}$ to be applied to the target pixel $D_{33}$ by the following expression from pixels $D_{11}$, $D_{15}$, $D_{51}$, and $D_{55}$ located on the corners of the square that is two columns and two rows away vertically and horizontally from the target pixel $D_{33}$.

$$\Delta D_{33}=|D_{33}-\text{INT}\{D_{11}+D_{55}+D_{15}+D_{51}\}/4\}|$$

wherein, INT{ }: an integer of the calculation result

That is to say, the enhancement amount $\Delta D_{33}$ to be applied to the target pixel $D_{33}$ is an absolute value of the difference in density between the target pixel $D_{33}$ and the average of the four pixels $D_{11}$, $D_{15}$, $D_{51}$, and $D_{55}$ that are two columns and two rows away vertically and horizontally (in the sub-scanning direction and the main scanning direction) from the target pixel $D_{33}$.

The calculation result is inputted to the selector 382 through its input terminal B, while an input "0" is inputted through the other input terminal A at all times. The elector 382 selects either "0" or the enhancement amount $\Delta D_{33}$ according to the edge signal inputted from the area judgment unit 390, and outputs whichever is selected through the output terminal Y. In other words, the selector 382 selects to output the enhancement amount $\Delta D_{33}$ when the edge signal corresponding to the target pixel $D_{33}$ is an ON signal, while selecting to output "0" when it is an OFF signal. This is done so because an enhancement amount is applied only to an edge pixel, and also because the enhancement amount increasing unit 383 that follows uses only the enhancement amount of an edge pixel.

Figure 5B:
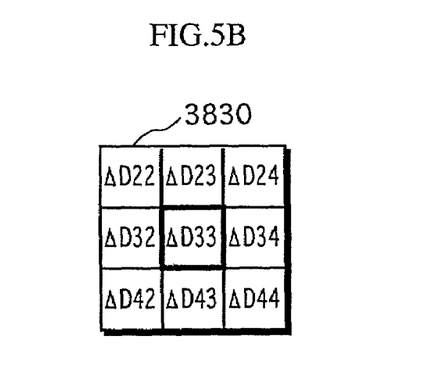
FIG. 5B is a view showing a MAX filter used by the enhancement amount calculation unit included in the above edge enhancement processing unit.

The enhancement amount increasing unit 383 increases each enhancement amount inputted from the selector 382 as necessary using a MAX filter 3830 formed of 3 by 3 pixels as shown in FIG. 5B. That is, the greatest enhancement amount is selected from the enhancement amounts, including the enhancement amount $\Delta D_{33}$, within an area that is one column and one row away vertically and horizontally from the target pixel (in the sub-scanning direction and the main scanning direction). The enhancement amount $\Delta D_{33}$ is then replaced with the thus selected enhancement amount. The result of this processing equally means that the enhancement amount of the target pixel is increased by the difference with the greatest enhancement amount found within the range of 3 by 3 pixels. Accordingly, the increased enhancement amount of each pixel obtained through the above processing as a whole involves smaller variations compared to the enhancements amounts without such increase.

Note that when the originally calculated enhancement amount to be applied to the target pixel happens to be the greatest one in the above area of 3 by 3 pixels, the greatest enhancement amount of the target pixel is maintained as it is without any increase. The above description of the enhancement amount increasing unit 383 which reads, "The enhancement amount increasing unit 383 increases each enhancement amount . . . as necessary" refers to such processing.

The enhancement amount having been processed by the enhancement amount increasing unit 383 is inputted to the selector 384 through its input terminal B, while an input "0" is inputted through the other imput terminal A at all times. Similar to the selector 382 described above, the selector 384 selects either "0" or the increased enhancement amount $\Delta D_{33}$ and outputs whichever is selected through the output terminal Y. In other words, the selector 384 selects to output the increased enhancement amount $\Delta D_{33}$ when the edge signal corresponding to the target pixel $D_{33}$ is an ON signal, while selecting to output "0" when it is an OFF signal. This is done so because the edge enhancement processing unit conducts enhancement processing (increase in density) only on edge pixels.

Figure 5C:
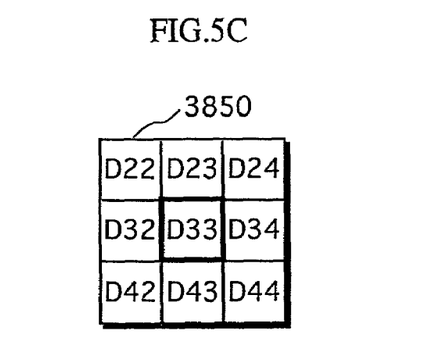
FIG. 5C is a view showing a MAX filter used by the enhancement amount calculation unit included in the above edge enhancement processing unit.

On the other hand, the density data "D" of each pixel outputted from the color correction processing unit 370B is also inputted to the density increasing unit 385. Here, processing is conducted to correct the density data of each pixel so as to increase the density. In a similar manner to the enhancement amount increasing unit 383, the density increasing unit 385 corrects, with the use of a MAX filter 3850 formed of 3 by 3 pixels shown in FIG. 5(c), the density data of each pixel so as to increase the density as necessary. That is, density data showing the greatest density is selected from the density data found in an area that is one column and one row away vertically and horizontally from the target pixel $D_{33}$ (in the sub-scanning direction and the main scanning direction), and the thus selected density data is designated as the density data of the target pixel $D_{33}$ after the increase processing (, which equally means that the density data of the target pixel $D_{33}$ is replaced with the thus selected density data). Here, the effect of this processing is the same as that achieved by the enhancement data increasing unit 383 above, and thus description thereof is omitted. Hereinafter, the density data after the increase processing (including the density data that ends up with no change as a result of the processing) is referred to as "the corrected density data".

The corrected density data is inputted to the selector 386 through its input terminal B, while the original density data which has not gone through the increase processing (hereinafter referred to as "the original density data") is inputted through the other input terminal A. The selector 386 then selects either the original density data or the corrected density data according to the edge signal inputted from the area judgment unit 390, and outputs whichever is selected through the output terminal Y. In other words, the selector 386 selects to output the corrected density data when the edge signal corresponding to the target pixel D33 is an ON signal, while selecting to output the original density data when it is an OFF signal.

The outputs separately from the selectors 384 and 386 corresponding to the same target pixel are inputted to the adder 387. The adder 387 adds the inputted values and outputs the thus obtained value. As a result, the density data inputted from the color correction processing unit 370B to the edge enhancement processing unit is subjected to enhancement processing in the case where the target pixel is an edge pixel, so that the corrected density data to which the increased enhancement amount is added is outputted (hereinafter, such an output is referred to as "the enhanced density"). When the target pixel is not an edge pixel, the original density data is outputted from the edge enhancement unit without any change.

As has been described above, according to this embodiment, the original density data of each edge pixel is corrected to increase the density, so that the density variations in an edge area are reduced on the whole. In addition, the enhancement amount calculated for each edge pixel is increased so as to reduce the density variations on the whole. The corrected density of each edge pixel (the enhanced density) is determined by applying the increased enhancement amount to the increased density data (corrected density data). Accordingly, variations in the enhanced density are further reduced comparing with the first prior art technique as well as with the second prior art technique.

Note that the MTF correction processing unit 380 conducts processing, such as smoothing processing, other than above described edge enhancement processing. Yet, such other processing is not a main subject matter of this invention, and thus description thereof is omitted.

Next, description is given to a concrete example of the edge enhancement processing described above, as well as to comparison of the concrete example of the present invention with another example that embodies the prior art theory using part of the construction of the present invention.

Figure 6:
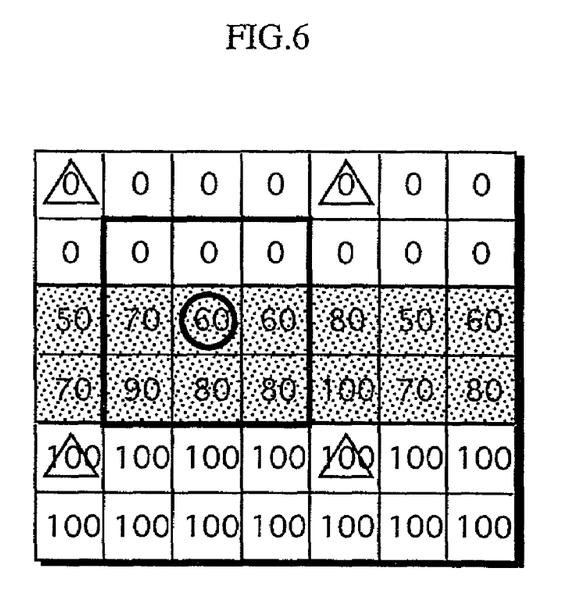
FIG. 6 is a view showing part of image data inputted to the above edge enhancement processing unit.

FIG. 6 is a view showing part of the density data outputted from the color correction processing unit 370B. In this figure, as well as in FIGS. 7–11 that follow, each smallest square represents one pixel, and the numeric value in each square represents its density or its enhancement amount. The greater the numeric value represents greater density or greater enhancement amount. Further, the lightly shaded area represents an edge area. FIGS. 6–11 show the same part of the same image data, so that the numeric value in a square at the same location in each figure is about the same pixel.

When, for example, a pixel marked with ○ in FIG. 6 is set as a target pixel, the enhancement amount calculation unit 381 performs calculation as shown below to figure out an enhancement amount from the target pixel and four pixels marked with Δ using the expression mentioned above.

Enhancement Amount=|60−INT{(0+100+0+100)/4}|=10

The enhancement amount calculation unit 381 shifts a target pixel to the right (in the main scanning direction) one by one and sequentially calculates an enhancement amount for each pixel.

Figure 7:
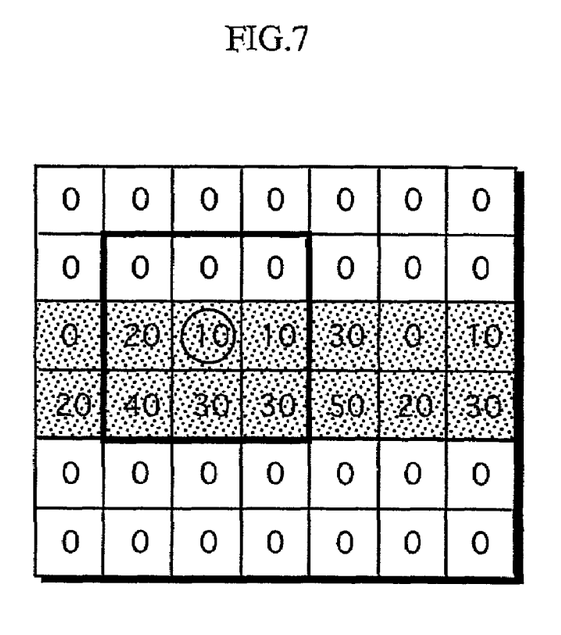
FIG. 7 is a view showing the enhancement amounts calculated from the image data shown in FIG. 6.

FIG. 7 is a view showing part of the enhancement amounts outputted from the selector 382, which is located immediate downstream from the enhancement amount calculation unit 381. The enhancement amounts are "0" when the corresponding pixels are not in an edge area. This is done so by the selector 382 as described above.

When, for example, the pixel marked with ○ in FIG. 7 is set as a target pixel, the enhancement amount increasing unit 383 replaces the enhancement amount of the target pixel with the enhancement amount "40", which is the greatest enhancement amount within the area of 3 by 3 pixels enclosed in a heavy-line square centering on the target pixel. Thus, "40" is designated as the increased enhancement amount for the target pixel. The enhancement amount increasing unit 383 shifts the target pixel to the right (in the main scanning direction) one by one, and sequentially increases the enhancement amount for each pixel.

Figure 8:
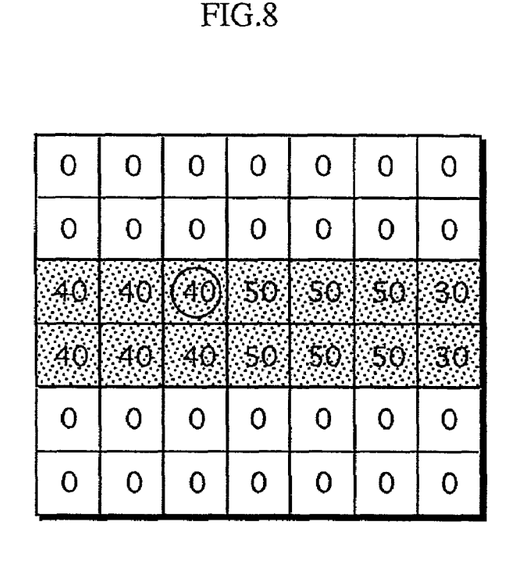
FIG. 8 is a view showing increased enhancement amounts calculated from the image data shown in FIG. 7.

FIG. 8 is a view showing part of the increased enhancement amounts that are outputted from the selector 384, which is located immediate downstream from the enhancement amount increasing unit 383 and inputted to the adder 387.

On the other hand, the density increasing unit 385 conducts processing to increase the density of each pixel shown in FIG. 6. When, for example, the pixel marked with ○ is set as a target pixel, the density increasing unit 385 replaces the density of the target pixel with the density "90", which is the greatest density within the area of 3 by 3 pixels enclosed in a heavy-line square centering on the target pixel. Thus, "90" is designated as the increased density of the target pixel (corrected density). The density increasing unit 385 also shifts the target pixel to the right (in the main scanning direction) one by one, and sequentially increases the density for each pixel.

Figure 9:
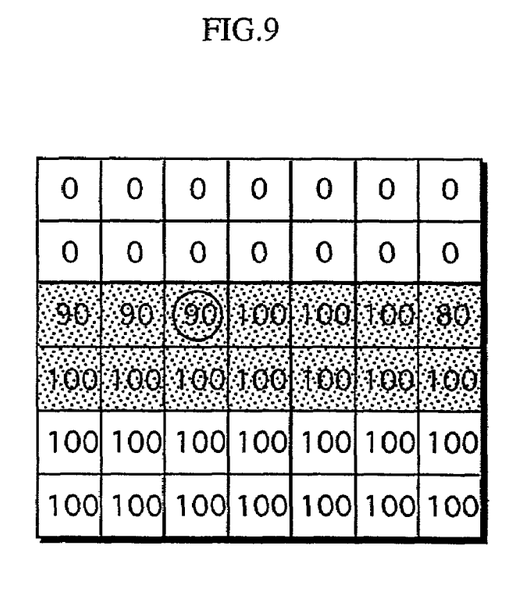
FIG. 9 is a view showing increased densities calculated from the image data shown in FIG. 6.

FIG. 9 is a view showing part of the density outputted from the selector 386, which is located immediate downstream from the density increasing unit 385, and inputted to the adder 387. Note that the densities remain unchanged from those shown in FIG. 6 when the corresponding pixels are not in an edge area. This is done so by the selector 386 as described above.

The adder 387 adds the values that are inputted from the selector 384 and the selector 386, and outputs the thus obtained result. That is to say, the adder 387 applies the enhancement amounts shown in FIG. 8 to the densities shown in FIG. 9, and outputs the thus obtained result.

Figure 10:
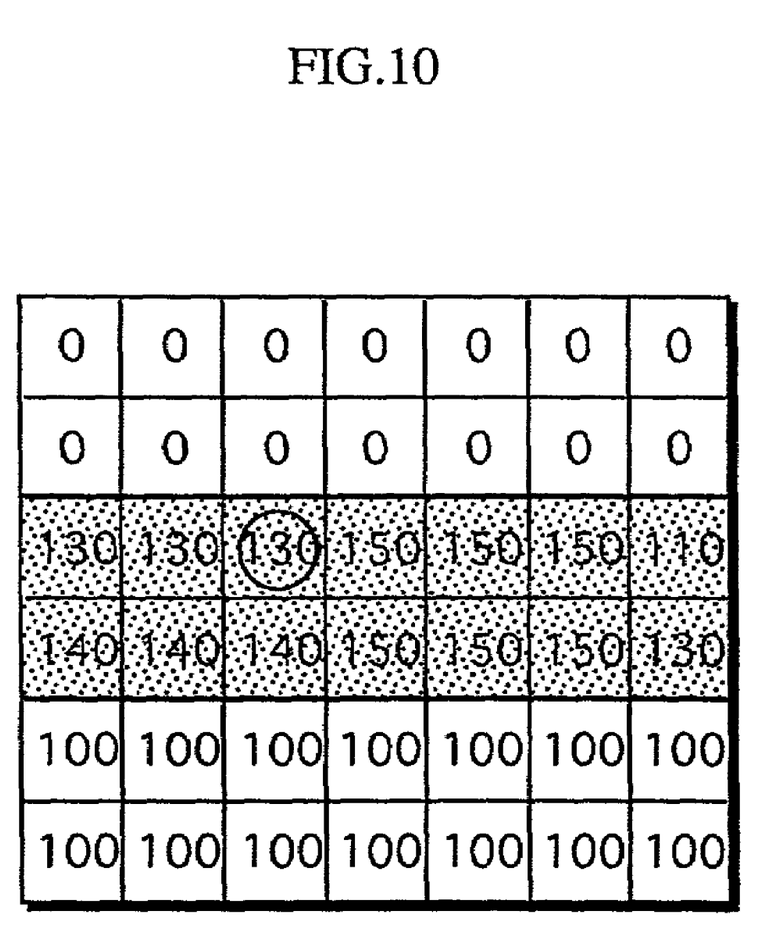
FIG. 10 is a view showing enhanced densities obtained by conducting edge enhancement processing on the image data shown in FIG. 6.

FIG. 10 shows part of the output from the adder 387. As is apparent from the comparison of this figure with FIG. 6, enhancement processing is conducted only on edge pixels. Here, the difference between the maximum and the minimum values in density is referred to as density variations, which represent the degree of density inconsistency. The variations in the edge area shown in FIG. 10 are 40 (=150−110).

Figure 11A:
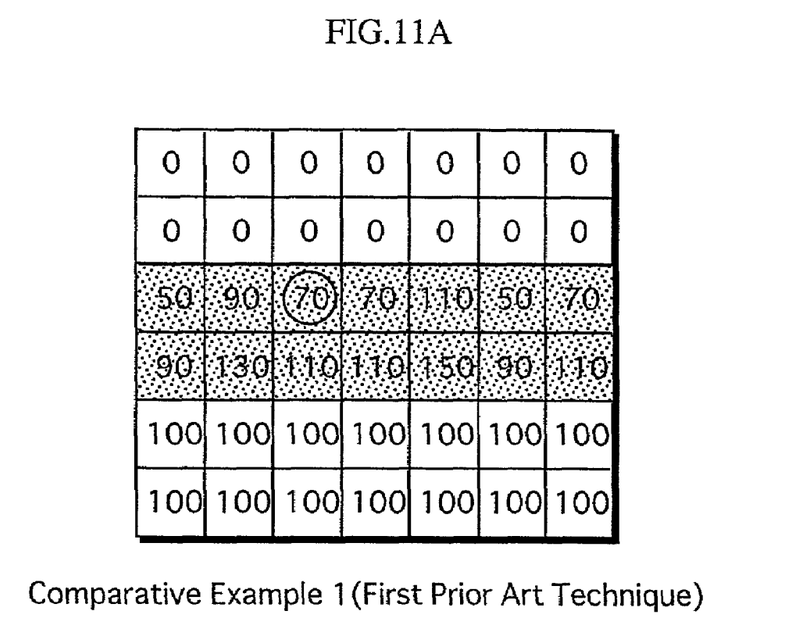
FIG. 11A is a view showing enhanced densities obtained by conducting edge enhancement processing on the image data shown in FIG. 6 in accordance with the first prior art technique (comparative example 1)

Next, description is given to the case where edge enhancement is conducted according to the first prior art technique as a comparative example 1. As is already described, in the first prior art technique, a density enhancement amount is calculated for each pixel, and an enhanced density is calculated by adding the calculated density enhancement amount and the original density of each pixel. That is to say, when the first prior art technique is applied to the construction according to the embodiment of the present invention, the enhancement amounts shown in FIG. 7 is added to the densities shown in FIG. 6 to obtain the enhanced densities. The result of the addition is shown in FIG. 11A. As shown in the figure, the minimum density and the maximum density in the edge area are "50" and "150", respectively. Thus, the density variations of the comparative example 1 in the edge area are 100.

Figure 11B:
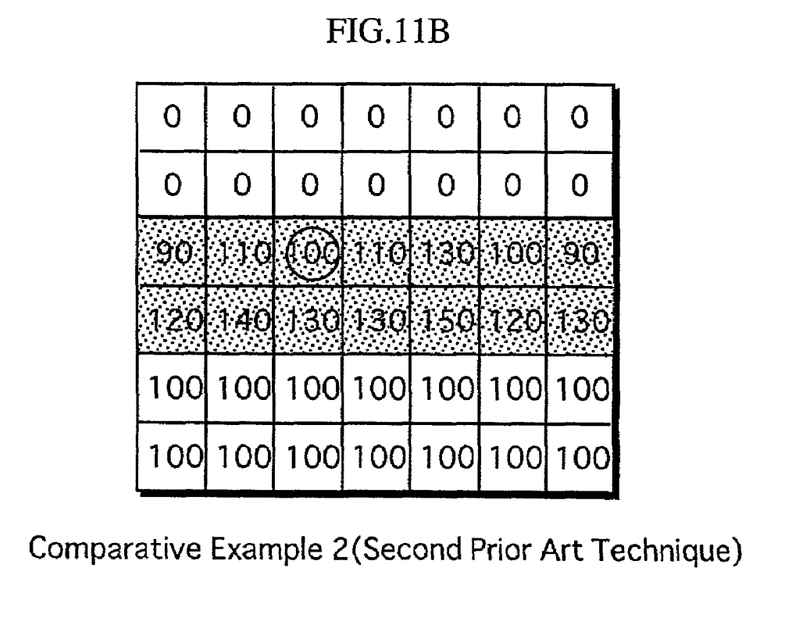
FIG. 11B is a view showing enhanced density obtained by conducting edge enhancement processing on the image data shown in FIG. 6 in accordance with the first prior art technique (comparative example 2).

Further, description is given to the case where edge enhancement is conducted according to the second prior art technique as a comparative example 2. As is also described, in the second prior art technique, a density enhancement amount is calculated for each pixel, and the density of each pixel is increased in a manner to decrease the density variations in the edge area. An enhanced density for each pixel is then calculated by adding the increased density and the calculated density enhancement amount. That is to say, when the second prior art technique is applied to the construction according to the embodiment of the present invention, the enhancement amounts shown in FIG. 7 is added to the densities shown in FIG. 9 to obtain the enhanced densities. The result of the addition is shown in FIG. 11B. As shown in the figure, the minimum density and the maximum density in the edge area are "90" and "150", respectively. The density variations of the comparative example 2 in the edge area are 60.

As apparently from the above results, the density variations in the edge area in this embodiment is 40, which means that the density variations i.e. inconsistency in density is smaller than the density variations of 60 in the comparative example 2, and certainly than the density variations 100 of the comparative example 1.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus for conducting edge enhancement processing on an original image, comprising:
    an enhancement amount calculation unit for calculating a density enhancement amount for each edge pixel of the original image, each density enhancement amount being an incremental value to be applied to a pixel value of the respective edge pixel to obtain an enhanced pixel value, each edge pixel being a pixel in an edge area in the image;
    an enhancement amount processing unit for correcting the density enhancement amount for each edge pixel in a manner to reduce variations in the density enhancement amounts in the overall edge area;
    a density processing unit for correcting a density of each edge pixel of the original image in a manner to reduce variations in densities in the overall edge area; and
    a density calculation unit for calculating an enhanced density of each edge pixel from the corrected density and the corrected density enhancement amount.

2. The image processing apparatus of claim 1, wherein the enhancement amount processing unit changes the density enhancement amount for a target pixel in the edge area to a greatest edge enhancement amount in a predetermined area that includes the target pixel and edge pixels surrounding the target pixel.

3. The image processing apparatus of claim 1, wherein the density processing unit changes the density of a target pixel in the edge area to a greatest density in a predetermined area that includes the target pixel and edge pixels surrounding the target pixel.

4. The image processing apparatus of claim 1, wherein the enhancement amount processing unit changes the density enhancement amount for a target pixel in the edge area to a greatest edge enhancement amount in a predetermined area that includes the target pixel and edge pixels surrounding the target pixel;

the density processing unit changes the density of the target pixel to a greatest density in a predetermined area that includes the target pixel and edge pixels surrounding the target pixel; and the density calculation unit calculates the enhanced density of each edge pixel by adding the changed enhancement amount and the changed density.

5. An image forming apparatus for forming an image, comprising the image processing apparatus of claim 1, wherein the image is formed based on image data on which edge enhancement processing has been conducted by the image processing apparatus.

6. An image processing apparatus for conducting edge enhancement processing on image data, comprising:

a judgment unit for judging whether a target pixel is an edge pixel which is in an edge area, based on the image data;

an enhancement amount calculation unit for calculating first data expressing an edge enhancement amount for the target pixel based on the image data, the edge enhancement amount being an incremental value to be applied to a pixel value of the target pixel to obtain an enhanced pixel value of the target pixel;

a first processing unit for changing a value of the first data for the target pixel to a greatest value among first data of a) the target pixel and b) a plurality of pixels surrounding the target pixel;

a second processing unit for changing a value of the image data of the target pixel to a greatest value among image data of a) the target pixel and b) a plurality of pixels surrounding the target pixel; and an addition unit for adding the changed first data to the changed image data of the target pixel that is judged to be an edge pixel by the judgment unit, and for outputting the resulting data.

7. An image forming apparatus for forming an image, comprising the image processing apparatus of claim 6, wherein the image is formed based on the image data on which edge enhancement processing has been conducted by the image processing apparatus.

8. An image processing method for conducting edge enhancement processing on an original image, the method comprising steps of:

calculating a density enhancement amount for each edge pixel of the original image, each edge pixel being a pixel in an edge area in the image, each density enhancement amount being an incremental value to be applied to a pixel value of the respective edge pixel to obtain an enhanced pixel value;

increasing the density enhancement amount for each edge pixel in manner to reduce variations in the density enhancement amounts in the overall edge area;

increasing density of each edge pixel of the original image in a manner to reduce variations in densities in the overall edge area; and calculating enhanced density of each edge pixel by adding the increased density enhancement amount to the increased density.

9. The image processing method of claim 8, wherein in the step of increasing the density enhancement amount for each pixel, the density enhancement amount for the target pixel is changed to a greatest density enhancement amount in a predetermined area that includes the target pixel and edge pixels surrounding the target pixel.

* * * * *